March 29, 1960 — J. T. SOBOTA — 2,930,229
APPARATUS FOR TESTING THE SOFTNESS OF PAPER PRODUCTS
Filed Feb. 4, 1957 — 2 Sheets-Sheet 1
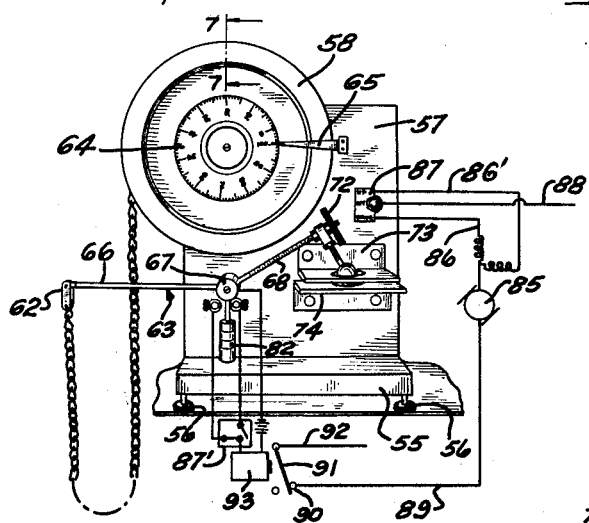
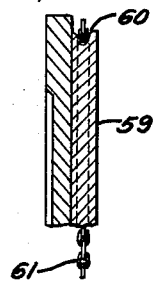
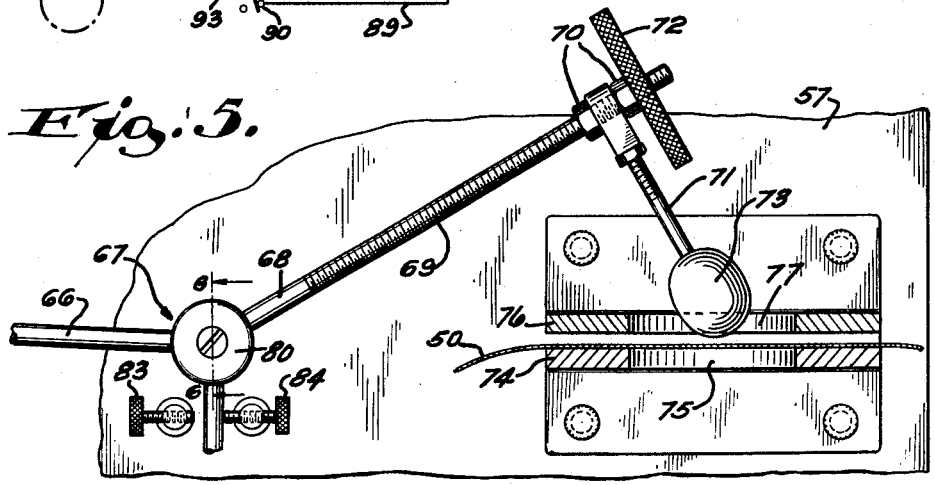
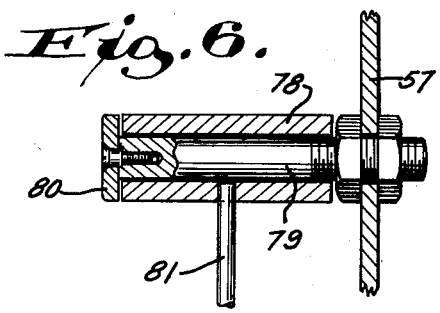
INVENTOR.
John T. Sobota
BY
ATTORNEYS.

March 29, 1960 J. T. SOBOTA 2,930,229
APPARATUS FOR TESTING THE SOFTNESS OF PAPER PRODUCTS
Filed Feb. 4, 1957 2 Sheets-Sheet 2
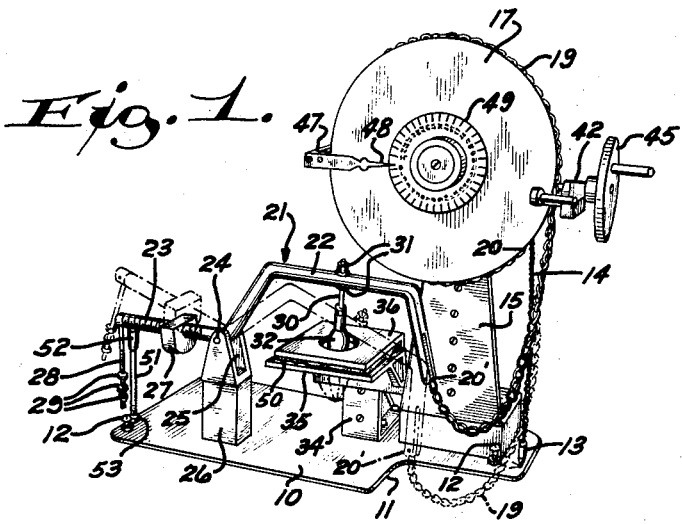
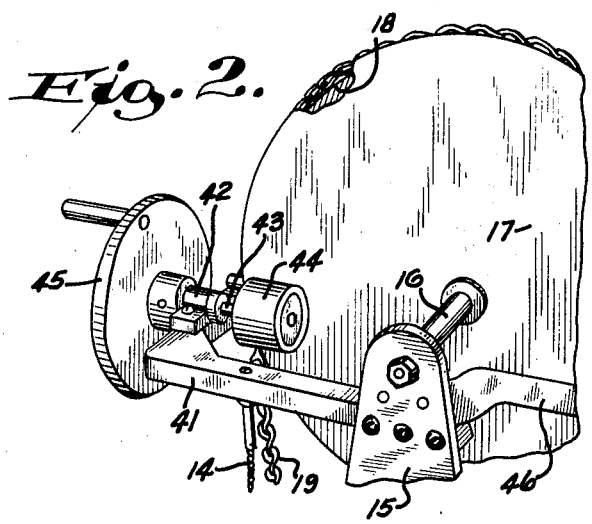
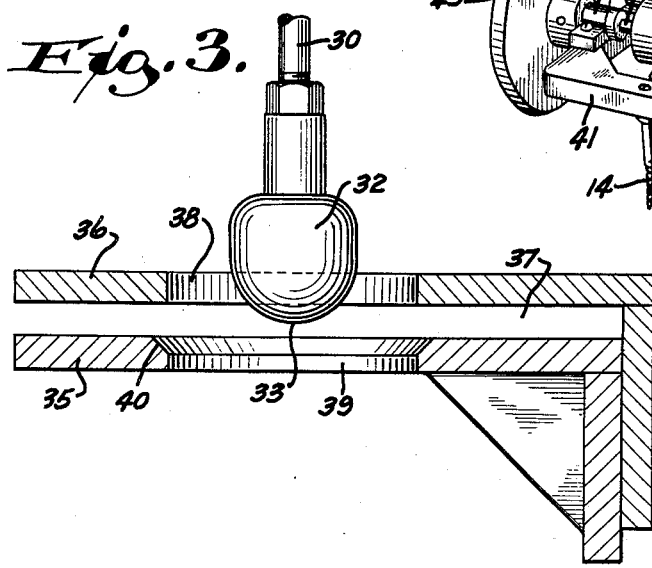
INVENTOR.
John T. Sobota
BY
ATTORNEYS.

United States Patent Office

2,930,229
APPARATUS FOR TESTING THE SOFTNESS OF PAPER PRODUCTS

John T. Sobota, Green Bay, Wis., assignor to Fort Howard Paper Company, Green Bay, Wis., a corporation of Wisconsin Application February 4, 1957, Serial No. 638,156

2 Claims. (Cl. 73—159)

This invention relates to improvements in apparatus for testing the softness of paper products.

In certain types of paper products such as paper napkins, facial tissue and toilet paper, the feel, texture or softness of the paper is an important property. In the textile industry a similar property is referred to as the "hand" of a fabric.

In my pending application, Serial No. 392,948, filed November 18, 1953, which has matured into Patent Number 2,786,352, a method is disclosed whereby softness of paper may be tested by manual operations. The present invention is designed to provide an improved testing device whereby the softness of paper may be machine tested with the apparatus giving an accurate reading of the force required to urge a sheet of paper through an opening in a supporting plate.

A further object of the invention is to provide improved apparatus by which the softness of paper products may be quickly determined and measured so that comparisons between various products may be quickly made.

A more specific object of the invention is to provide apparatus as above described, wherein a flexible chain is slowly moved to progressively change the force exerted on one end of a fulcrumed lever, the amount of chain which is moved being calibrated on a dial. By using chains of various weight almost any degree of sensitivity may be obtained.

Other objects of the invention are to provide an apparatus as above described which is relatively simple and inexpensive in construction, easy to operate, and which is otherwise well adapted for the purpose described.

With the above and other objects in view, the invention consists of the improved apparatus for testing the softness of paper products, and all of its parts and combinations, as set forth in the claims, and all equivalents thereof.

In the accompanying drawings, illustrating one complete embodiment of the preferred form of the invention, in which the same reference numerals designate the same parts in all of the views:

Fig. 1 is a perspective view of the improved apparatus, principally in front elevation, the dot-and-dash lines indicating the position of the parts after the paper being tested has been forced through a hole of the supporting plate;

Fig. 2 is a fragmentary perspective view looking principally at the reverse side of the wheel from that shown in Fig. 1;

Fig. 3 is an enlarged fragmentary vertical sectional view taken through the paper supporting plates;

Fig. 4 is a view similar to Fig. 1 showing a modification;

Fig. 5 is a fragmentary detail view of part of the apparatus of Fig. 4, part being shown in vertical section and a sample of paper to be tested being shown in position;

Fig. 6 is a fragmentary sectional view taken on the line 6—6 of Fig. 5; and

Fig. 7 is a fragmentary sectional view taken on the line 7—7 of Fig. 4.

Referring more particularly to the drawings, the numeral 10 designates a base plate which may be supported on a table (not shown). The base plate has a cutout corner 11 which must be made to register with a hole in the table. A suitable number of levelling screws 12 are threaded into the base so that by adjustment of the latter the device may be made perfectly level as indicated by a plumb bob 13 on the lower end of a small chain 14, the device being level when the plumb bob registers with a suitable mark on the base.

Projecting upwardly from the base is a standard 15 which supports a transverse stud 16. Rotatably mounted on the stud is an indicating wheel 17 having a peripheral groove 18. A chain 19 or elongated flexible weight has a portion wrapped on the wheel with one end secured to the wheel within the groove as at 20. The outer portion of the chain is suspended in the form of a sling from the wheel as shown in Fig. 1, its end being connected as at 20' with one end of a beam 21.

The beam 21 includes an inverted U-shaped portion 22 on one side of the fulcrum 24, and a straight arm 23 on the other side. The beam is pivoted as at 24 in the fork 25 of a standard 26, the latter projecting upwardly from the base 10.

The beam portion 23 is finely threaded and a balancing weight 27 is threaded thereon for adjustable movement toward and away from the fulcrum 24. At the outer end of the beam portion 23 is a depending threaded rod 28 on which balancing weights 29 are threaded for vertical adjustment.

Projecting downwardly from the uppermost portion of the inverted U-shaped part 22 of the beam is a plunger rod 30. The upper end of the plunger is vertically adjustably secured in position by nuts 31. Carried by the lower end of the plunger 30 is a ball 32 of rubber or the like having a semi-spherical lower portion 33.

Suitably supported on a bracket 34 projecting upwardly from the base 10 is a bottom testing plate 35 and a top plate 36, the plates being permanently separated by a vertical gap 37 which is preferably one-fourth of an inch. The upper plate has a circular opening 38 which is approximately concentric with the plunger 30 when the latter is in the position of Fig. 1, and the lower plate has an aligned opening 39. The lower part of the thickness of the latter is preferably the same diameter as the opening 38, but its upper portion is chamfered at a 45° angle as at 40 for about half the thickness of the plate 35. The diameter of the lower portion of the hole 39 is preferably twice the diameter of the plunger ball 32. For the testing of toilet paper it is preferred to have the diameter of the hole 39 two inches and the diameter of the plunger one inch, using a four and one-half inch square sheet of paper. These relationships may, of course, be varied, depending upon the material being tested.

Projecting laterally from the upper portion of the standard 15 is an arm 41 which supports a horizontal bearing 42. A driven shaft 43 is journalled in the bearing and carries a rigidly mounted friction wheel 44 which is engageable with the rear face of the indicating wheel 17 to drive the latter. Any suitable means may be employed to drive the shaft 43. For simplicity, a hand wheel 45 has been shown.

Projecting laterally in the opposite direction from the standard portion 15 is an arm 46 which has a U-shaped end 47 embracing the periphery of the wheel and carrying a pointer 48 which co-acts with an indicating dial 49 on the front of the wheel 17 to give a reading.

Projecting upwardly from the base 10 is a stop rod 51 having an upper end bumper 52 of rubber or the like, which is adapted to be engaged by the end 23 of the beam when it is in the position of Fig. 1. The effective length of the stop rod 51 may be varied by manipulation of the nut 53 to suit requirements.

To calibrate the machine, the standard 34 together with the plates 35 and 36 is removed and replaced by a pan-type of balancing scale. The rubber plunger 32 is made to rest on the exact center of one pan of the scale, and a ten gram weight, for example, may be placed on the other pan. Prior to carrying out this procedure, the beam must be in exact balance. This exact balance may be obtained by suitable shifting of the balancing weights 27 and 29. By use of such balancing weights it is possible to keep the beam balanced in any position. The placing of the ten gram weight in the pan of the balancing scale will, of course, cause this pan to be depressed. Then, by turning the hand wheel 45 slowly, an increased amount of chain weight is transferred from the wheel 17 to the beam portion 22 and such chain weight is transferred until the beam is again in balance. If this takes 30° of revolution of the wheel 17, then the calibration of the chain is ten divided by thirty, or .33 gram per degree of rotation of the wheel. Several points can be checked this way. By using chains of various weight, almost any degree of sensitivity may be obtained.

In the modification illustrated in Figs. 4-7 inclusive there is a base plate 55 having levelling screws 56. Projecting upwardly from the base is a standard 57 which rotatably supports an indicating wheel 58 which may be similar to the wheel 17 of Fig. 1. The wheel 58 may have a grooved disk 59 secured to its rear having a groove 60 for the chain 61 or other elongated flexible weight. One end of the chain is secured to the disk 59 and the major portion of the chain is suspended in the form of a sling from the wheel as shown in Fig. 1, its other end being connected as at 62 to one arm of a beam 63. The wheel includes an indicating dial 64 and there is a pointer 65 on the standard 57 for co-action with the dial.

The beam 63 includes an arm portion 66 on one side of a fulcrum 67 and another arm portion 68 on the other side of the fulcrum, the latter being threaded throughout most of its length as at 69. Nuts 70 which are threaded on the portion 69 clamp the upper eyed end of a plunger rod 71 in a desired position of longitudinal adjustment on the lever portion 68. A weight 72 is also threaded on the lever 68. The lower end of the plunger 71 carries a ball 73 like the ball 32 of Fig. 1.

Suitably supported on the standard 57 is a bottom testing plate 74 having an opening 75. There is also a top plate 76 having an opening 77 which is in alignment with the opening 75 of the bottom plate. The plates are preferably vertically spaced as shown in Fig. 5 and the sample of paper 50 to be tested is adapted to be placed over the bottom plate as shown. The relationship between the size of the ball 73, the diameters of the openings and the spacing between plates is preferably as heretofore described in connection with the form of the invention of Fig. 1.

The fulcrum for the beam includes a sleeve 78 rotatable around a horizontal pivot stud 79 which projects from the standard 57. An end cap 80 holds the sleeve in position. The arms 66 and 68 project from the sleeve 78. In addition there is a rod 81 depending from the sleeve and carrying weights 82. The rod 81 is adapted to contact adjustable limit screws 83 or 84.

The wheel 58 may be driven in any suitable manner preferably by a reversible electric motor 85 with suitable reduction gearing. One wire 86 and one wire 86' from the "up" and "down" windings of the motor connect with a manual switch 87. Another wire 88 from the switch may extend to source of current. A wire 89 from the other side of the motor connects with one terminal 90 of a relay operated switch 91. The other wire 92 from the relay operated switch may extend to the current source.

The relay may include a magnet 93 which is electrically connected to both screws as shown in Fig. 4 through switch 87' so that magnet is energized whenever the rod 81, which is also in the circuit to the magnet 93, strikes either limit screw 83 or 84. Switch 87' is operated simultaneously with switch 87 to connect (or disconnect) the proper limit screw 83 or 84. As shown in Fig. 4 this will energize the magnet to open the circuit to the electric motor 85 whenever the beam reaches its limit of movement in either direction as determined by the adjustable screws. The motor may be manually started by the manual switch 87.

To calibrate the machine of Figs. 4-7 the same procedure is used as heretofore described in connection with the apparatus of Fig. 1. In the machine of Fig. 4 the point of exact balance is obtained by adding or subtracting a little of the chain. When the point of exact balance is found, the graduated dial is set at the zero. The dial is adjustable relative to the wheel by any suitable spring and friction contact.

It should be noted that the apparatus of Fig. 1 is in balance when substantially all the chain is on the wheel. In Fig. 1 weight is applied to the plunger by taking chain off the wheel. This is the opposite of Fig. 4, where weight is applied to the plunger by putting chain on the wheel.

*Operation*

In order to test a sheet of paper with the machine of Fig. 1, a paper sample 50 is placed between the plates 35 and 36 on top of the testing plate 35, as shown in Fig. 1. As before mentioned, for testing toilet paper it is preferred to use a sheet four and one-half inches square. The chain wheel 17 is then slowly rotated, preferably at 2 r.p.m. to play out the chain. This transfers chain weight from the wheel 17 to the beam portion 22, causing the plunger ball 32 to press against the paper sample 50 which is over the hole 39. The wheel 17 is rotated until the plunger ball drives the sheet into the hole in substantially the manner shown by dot-and-dash lines in Fig. 1, and the indicating wheel is stopped at the instant that the plunger causes the paper to be thus urged. The spot on the dial 49 to which the pointer 48 points will then give a reading of the force required to urge the sheet of paper to the dot-and-dash line position of Fig. 1 in the hole. In testing commercial toilet paper it is found that it may take six times as much force to urge a relatively cheap hard sheet through the hole 39 than it takes to urge facial quality toilet paper therethrough. The apparatus may be used to compare the softness of various grades and also for demonstration purposes in connection with sales work.

By having spaced plates 35 and 36, outer edge portions of the sample of paper are restrained against movement to an upright position as soon as force is applied to the center of the sample.

In use of the apparatus of Figs. 4-7 inclusive, with the plunger off the paper as shown in Fig. 5, rotation of the wheel 58 is started in a direction to wind up chain 61 so as to gradually remove load from the arm 66. Where the wheel is motor driven this operation is commenced by use of the manual switch 87 to start the motor 85. As the load is removed from the arm 66 the plunger ball 73 will eventually drive the sheet into the hole 75 a predetermined distance as determined by the setting of the screw 83. As the rod 81 strikes the screw 83 it will complete the circuit to the relay magnet 93 and cause opening of the switch 91 and breaking of the circuit to the motor 85 to stop the wheel at the exact instant that the plunger has caused the paper to be driven through the hole. The point on the dial 64 to which the pointer 65 points will then give a reading of the force which has been required. Where the wheel is motor-driven the motor is preferably reversible to reverse the position of the chain so as to bring the parts back to the starting position of Fig. 5. By proper manipulation of the limit screw 84 the circuit to the relay magnet 93 is again completed when the rod 81 strikes the screw 84 to open the switch 91 and stop the motor when the parts have returned to the position of Fig. 5. Any suitable electric circuit, such as that shown diagrammatically in Fig. 4, may be utilized to accomplish the above.

Various changes and modifications may be made without departing from the spirit of the invention, and all of such changes are contemplated, as may come within the scope of the claims.

What I claim is:

1. Apparatus for testing the softness of a paper sample comprising a sample supporting plate having a hole therein; a fulcrumed beam having an arm extending laterally over said plate, having an oppositely projecting lateral arm, and having a depending arm; pushing means depending from said first lateral arm in a position to force said paper sample into said hole in the plate when the beam is rocked on its fulcrum in a direction to move said pushing means toward the hole; and elongated flexible weight member having an end connected to one of the lateral arms of said beam; means including a motor driven wheel on the periphery of which a portion of the flexible member is wound for progressively varying the amount of weight of said elongated flexible member acting on the arm until gravity causes the pushing means to force the paper sample into said hole; means engaged by said depending arm for stopping said motor driven wheel after said sample has been forced into said hole; and means associated with said wheel for indicating the amount of variance in flexible weight employed to give a reading of the force required to thus force the paper sample into said hole.

2. Apparatus for testing the softness of a paper sample comprising a sample supporting plate having a hole therein; a fulcrumed beam having an arm extending laterally over said plate, having an oppositely projecting lateral arm, and having a depending arm; pushing means depending from said first lateral arm in a position to force said paper sample into said hole in the plate when the beam is rocked on its fulcrum in a direction to move said pushing means toward the hole; an elongated flexible weight member having an end connected to one of the lateral arms of said beam; a wheel having a periphery on which a portion of said flexible member is wound for progressively varying the amount of weight of said elongated flexible member acting on the arm until gravity causes the pushing means to force the paper sample into said hole; means including a reversible motor for driving said wheel, means engaged by said depending arm after it has swung in one direction as a result of said movement of the beam for stopping said motor and wheel after said sample has been forced into said hole; means engaged by said depending arm for stopping a reverse movement of said motor and wheel after said beam has been moved a sufficient distance in a reverse direction to withdraw the pushing means from the hole; and means associated with said wheel for indicating the amount of variance in flexible weight employed to give a reading of the force required to drive the paper sample into said hole.

References Cited in the file of this patent

UNITED STATES PATENTS

| | | |
|---|---|---|
| 1,878,193 | Scott et al. | Sept. 20, 1932 |
| 2,127,995 | Grainger | Aug. 23, 1938 |
| 2,497,052 | Williams | Feb. 7, 1950 |
| 2,645,935 | Pramuk et al. | July 21, 1953 |
| 2,718,142 | Schwartz et al. | Sept. 20, 1955 |
| 2,884,239 | Ghezzi et al. | Apr. 28, 1959 |